US012514687B2

(12) United States Patent
Shirzadi

(10) Patent No.: US 12,514,687 B2
(45) Date of Patent: Jan. 6, 2026

(54) ARRANGEMENT WITH A TOOL AND WITH A FASTENING MEANS, AND METHOD FOR FASTENING A FASTENING MEANS

(71) Applicant: SOLINPLAN UG, Hamburg (DE)

(72) Inventor: Houtan Shirzadi, Hamburg (DE)

(73) Assignee: SOLINPLAN UG, Hamburg (DE)

( * ) Notice: Subject to any disclaimer, the term of this patent is extended or adjusted under 35 U.S.C. 154(b) by 429 days.

(21) Appl. No.: 17/777,098

(22) PCT Filed: Nov. 13, 2020

(86) PCT No.: PCT/EP2020/082109
§ 371 (c)(1),
(2) Date: May 16, 2022

(87) PCT Pub. No.: WO2021/094567
PCT Pub. Date: May 20, 2021

(65) Prior Publication Data

US 2022/0395357 A1 Dec. 15, 2022

(30) Foreign Application Priority Data

Nov. 17, 2019 (DE) ......................... 102019007955.8

(51) Int. Cl.
*A61C 8/00* (2006.01)

(52) U.S. Cl.
CPC .......... *A61C 8/0063* (2013.01); *A61C 8/0068* (2013.01)

(58) Field of Classification Search
CPC ..... A61C 8/0063; A61C 8/0068; B25B 23/10; B25B 23/101; B25B 23/103; B25B 23/105; B25B 23/106; B25B 23/108; B25B 23/08

(Continued)

(56) References Cited

U.S. PATENT DOCUMENTS 4,060,113 A * 11/1977 Matsushima ......... B25B 23/106 81/448
4,190,091 A * 2/1980 Colognori ............. B25B 23/101 411/407

(Continued)

FOREIGN PATENT DOCUMENTS

DE 19910676 A1 10/2000
DE 102008029240 A1 12/2009

(Continued)

OTHER PUBLICATIONS

International Search Report, European Patent Office, Feb. 3, 2021.

*Primary Examiner* — Matthew M Nelson
(74) *Attorney, Agent, or Firm* — Bay State IP, LLC

(57) ABSTRACT

An arrangement with a tool and with a fastening means having a longitudinal direction is provided. The tool is designed to screw the fastening means into a body in the longitudinal direction; the tool has a blade with a first holding element and a second holding element; the fastening means has a first holding section with a complementary first holding element and a second holding section with a complementary second holding element. In the first holding section, the first holding element and the complementary first holding element interact in such a way that a translatory movement of the blade in the longitudinal direction is blocked. In the second holding section, the second holding element and the complementary second holding element interact in such a way that a rotary movement of the blade can be transferred to the fastening means and the fastening means can be screwed into the body.

13 Claims, 4 Drawing Sheets

Figure 1:
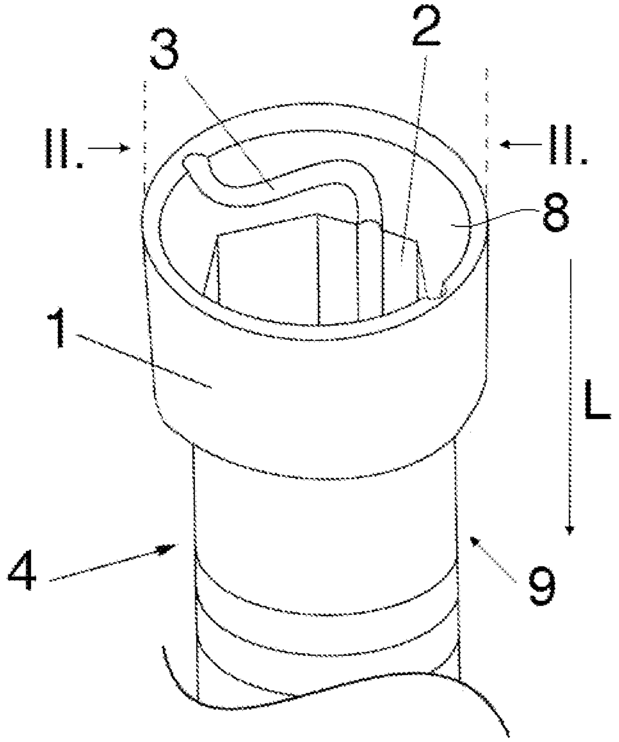

(58) Field of Classification Search
USPC .......................................................... 433/174
See application file for complete search history.

(56) References Cited

U.S. PATENT DOCUMENTS

| | | | | | |
|---|---|---|---|---|---|
| 5,065,649 | A * | 11/1991 | Evers | B25B 23/101 | 81/125 |
| 5,139,499 | A * | 8/1992 | Small | H04L 25/066 | 606/301 |
| 5,237,893 | A * | 8/1993 | Ryder | B25B 15/005 | 81/436 |
| 5,353,667 | A * | 10/1994 | Wilner | B25B 15/007 | 81/436 |
| 5,582,548 | A * | 12/1996 | Czegledi | B21K 1/463 | 411/407 |
| 5,868,049 | A * | 2/1999 | Kanwal | F16B 23/0007 | 81/460 |
| 9,044,843 | B1 * | 6/2015 | Mokhtee | B25B 15/005 | |
| 2001/0022120 | A1 * | 9/2001 | Mark | B25B 15/005 | 81/452 |
| 2005/0178252 | A1 * | 8/2005 | Appenzeller | B25B 23/108 | 81/451 |
| 2005/0209592 | A1 * | 9/2005 | Schlapfer | B25B 23/108 | 606/60 |
| 2006/0278050 | A1 * | 12/2006 | Hsiao | B25B 23/101 | 81/125 |
| 2007/0068349 | A1 * | 3/2007 | Min | B25B 15/008 | 81/436 |
| 2008/0269768 | A1 * | 10/2008 | Schwager | B25B 23/108 | 81/436 |
| 2009/0038447 | A1 * | 2/2009 | McCracken | B25B 23/10 | 81/454 |
| 2010/0030278 | A1 * | 2/2010 | Hawkes | B25B 13/44 | 606/301 |
| 2010/0229697 | A1 * | 9/2010 | Snead | B25B 23/10 | 81/452 |
| 2010/0269644 | A1 * | 10/2010 | Edland | F16B 23/0053 | 411/407 |
| 2011/0097688 | A1 * | 4/2011 | Rebaudi | A61C 8/0018 | 433/174 |
| 2011/0098715 | A1 * | 4/2011 | Laubert | B25B 23/108 | 81/436 |
| 2012/0057949 | A1 * | 3/2012 | Canizares, Jr. | A61B 17/862 | 411/410 |
| 2012/0253355 | A1 * | 10/2012 | Murray | B25B 15/005 | 606/104 |
| 2014/0260833 | A1 * | 9/2014 | Kana | B25B 23/105 | 81/452 |
| 2014/0272788 | A1 * | 9/2014 | Bellanca | A61C 8/005 | 433/201.1 |
| 2015/0257807 | A1 * | 9/2015 | Strnad | A61B 17/8888 | 81/451 |
| 2015/0351867 | A1 * | 12/2015 | Courvoisier | A61C 8/0089 | 433/165 |
| 2016/0082577 | A1 * | 3/2016 | Sanders | A61B 17/8888 | 81/452 |
| 2016/0158926 | A1 * | 6/2016 | Wang | B25B 15/008 | 81/436 |
| 2017/0305000 | A1 * | 10/2017 | Kennedy | B25B 23/106 | |
| 2018/0306230 | A1 * | 10/2018 | Norton | B25B 23/108 | |
| 2020/0129214 | A1 * | 4/2020 | Pepper | A61B 17/8625 | |
| 2022/0218446 | A1 * | 7/2022 | Park | A61C 8/0089 | |
| 2022/0395357 | A1 * | 12/2022 | Shirzadi | A61C 8/0063 | |

FOREIGN PATENT DOCUMENTS

| | | | |
|---|---|---|---|
| WO | 9942735 | A1 | 8/1999 |
| WO | 2017106913 | A1 | 6/2017 |

* cited by examiner

ARRANGEMENT WITH A TOOL AND WITH A FASTENING MEANS, AND METHOD FOR FASTENING A FASTENING MEANS

CROSS REFERENCE TO RELATED APPLICATION

This application is for entry into the U.S. National Phase from which priority is claimed under all applicable sections of Title 35 of the United States Code including, but not limited to, Sections 120, 363, and 365 (c) to International Application No. PCT/EP2020/082109 filed on Nov. 13, 2020, and which in turn claims priority under 35 USC 119 to German Patent Application No. 102019007955.8 filed on Nov. 17, 2019.

The invention relates to an arrangement with a tool and with a fastening means having a longitudinal direction, wherein the tool is designed to fasten the fastening means in the longitudinal direction adapted to be received in a body. The invention also relates to a method for fastening a fastening means having a longitudinal direction with a tool and the fastening means (4) is adapted to be received in a body.

Temporary connections between fastening means and tools in the form of screws and screwdrivers are found in different areas of technology as well as in articles for everyday use.

For example, the screwing of a screw into a threaded bore constitutes a generally known and technical and everyday situation. A screw placed onto a screwdriver can come loose unintentionally from the screwdriver or an insertion tool in general on the way to the threaded bore and as a result ends up outside the monitored working range, for example it can fall down.

In order to counteract this, a screw is frequently held by fingers or for example by magnetic attraction of a screwdriver tip.

There are also devices which are intended to secure the screw on the screwdriver.

In DD 232665 A1, for example, a screwdriver is described which, by spreading its two-part engagement member after introduction into the screw slot, is intended to ensure the connection to the screw.

In DD 124328 A1 a screw holder consisting of a wedge-shaped sleeve is described, which has springs bent in opposite directions in an S shape on the wedge surfaces. After the screw is placed onto the corresponding screwdriver, the screw holder, placed onto the screwdriver, engages with the spring ends under the screw head and thereby holds the screw on the screwdriver.

A screw and a turning tool for turning a screw are known from EP 2 314 418 A1. In this case protrusions on a slotted engagement member engage behind recesses in a screw head. A disadvantage of this is that, after a simple backwards movement has been carried out in the form of a rotary movement, the screw head and the screwdriver become detached from one another.

In WO 00/20766 a screw and a screwdriver for a screw which does not slip off are disclosed, wherein here as well projections from a screwdriver are screwed into slots of the screw head and engage behind the screw head.

A similar principle is also disclosed in U.S. Pat. No. 5,868,049 as well as in U.S. Pat. No. 5,353,667.

A disadvantage of the aforementioned prior art in all cases is that, although it is made difficult for the screw to be loosened by chance from the screwdriver, when the screw turns counter to its screwing-in direction it can nevertheless fall down from the screwdriver due to this simple backwards movement.

There are frequently difficulties in maintaining a resilient stability of the connection between the screw and the screwdriver during a working process. If for example the screw and the screwdriver have very small dimensions, i.e. within the millimetre range, the engagement member of the insertion tool has correspondingly small dimensions. Shaped parts which are intended to stabilise the connection must then have correspondingly small dimensions, as for example in DD 214328 A1. On the one hand this leads to difficult handling and on the other hand it is unfavourable for the stability of the connection, for example relative to suddenly occurring shear and pull-off forces. A particular problem is the connection of screws and insertion tools during certain treatments, operations in medicine, for example in the field of dental medicine in the area of oral implantology. In this area of dentistry so-called endosseous implants, that is to say artificial tooth roots, usually made of titanium, are inserted into the alveolar ridge bone and are then covered by small screws for the healing phase. Later, the dental prosthesis or parts thereof to be supported by this implant are fixed by further different small screws, so-called prosthetic screws, on this implant. Therefore, in various phases before completion of the dental prosthesis small screws, often only a few millimetres in size, must be screwed into implants a number of times inside the oral cavity and unscrewed again.

The safe handling of such small screws is already difficult because of the confined spatial conditions in the oral cavity. This difficulty is exacerbated by the movements of the jaw as well as the cheek and tongue musculature. However, the practitioner must ensure that such screws remain under his control during the treatment in the oral cavity. The grip between the screw head and the insertion tool usually comes about by means of force-fitting connections, such as for example the connection by means of an internal and external hexagon. In this case problems can be caused by for example shear and pull-off forces which, during work in the confined space in the oral cavity, can often occur in a pulsed manner due to sudden movements of the tongue, the cheeks etc. and can act on the screw which has not yet been screwed into the internal thread of the implant. This can lead to the screw suddenly coming loose from the insertion tool, e.g. a special hexagon key, and the practitioner losing control over the screw and the screw being, for example, swallowed or entering the respiratory system. The practitioner must prevent such a situation.

Securing the screws with strips, such as for example dental floss, attached thereto is difficult and complicated inter alia because of the small dimensions of the screws of a few millimetres and the implant structures, the confined passage of which must be passed through by the screws in order to be able to be screwed into the threaded bore in the interior of the implant. Other safety measures, which are intended to stabilise the screw on the insertion tool and in so doing would have to grip the screw from the outside, are also made difficult by this confined passage. There would be hardly any space for this, and the passage of the screw through the confined passage would be difficult. In the aforementioned treatment procedures a fine-motor and precise guidance of the screw or of the insertion tool is necessary. Measures for stabilising the connection of screw and screwdriver or for securing the screw, which during the treatment in the oral cavity require additional applications of force or special hand or finger movements, are therefore unfavourable for the treatment.

In other areas of medicine there are comparable conditions with the corresponding risks, such as for instance in the screwing of metal plates to the bone for fixing and stabilising bone fractures, so-called plate osteosynthesis.

It is therefore an object of the present invention to achieve a greater stability of short-term connections between the fastening means and the tool by a corresponding arrangement of the tool and the fastening means and to provide a method for fastening a fastening means.

With regard to the arrangement this object is achieved by an arrangement with the features of claim 1.

The arrangement according to the invention comprises a tool having a fastening means which has a longitudinal direction, wherein the tool is designed to fasten the fastening means which is adapted to be received in the longitudinal direction in a body, wherein the term "fastening means" should be construed broadly here, and in particular the fastening means can have a thread which can be rotated to the right and left or can also have a different form adapted to be anchored in a body.

The fastening means is preferably a screw, preferably a screw which is screwed into endosseous implants, in particular a prosthetic screw or cover screw. The body can involve different materials, for example wood, steel, titanium or the like.

The tool has an engagement member. The tool can be a screwdriver having an engagement member, wherein the engagement member can be introduced into the screw only in the longitudinal direction.

According to the invention the tool has an engagement member with a first holding element and a second holding element, and the screw has a first holding section with a complementary first holding element and a second holding section with a complementary second holding element, and the engagement member can be introduced into the fastening means, in particular a head of the fastening means, preferably in the longitudinal axis of the fastening means, and in the first holding section the first holding element and the complementary first holding element interact, namely in such a way that in the longitudinal direction a translatory movement, preferably a strictly translatory movement in the longitudinal direction of the engagement member, is interrupted or blocked, wherein here a strictly linear relative movement between the engagement member and the head of the fastening means is designated as a translatory movement, which preferably extends precisely in the longitudinal direction of the tool interlinked with the screw.

According to the invention, in a second holding section the second holding element and the complementary second holding element interact in such a way that a rotary movement of the engagement member can be transferred to the fastening means and the fastening means can be adapted to be fastened in the body, preferably the screw can be adapted to be screwed into the body.

The invention makes use of the idea of temporarily fastening together a fastening means and a tool for screwing in the screw, preferably a screwdriver, in such a way that two mechanisms of action are used separately from one another in terms of space and time.

When the engagement member of the tool is introduced into a head of the fastening means, preferably the screw head of the screw, firstly the first holding element and the complementary first holding element interact. This takes place in the first holding section. After running through the first holding section with a leading end of the engagement member, the second holding element and the complementary second holding element interact in an adjoining second holding section. The second holding element and the complementary second holding element are intended to screw the screw into an internal thread, whereas the first holding element and the complementary first holding element in the first holding section are intended to run through a non-trivial, i.e. not purely translatory path, so that a reverse movement of this path, which is the only way it would be possible for the fastening means to fall from the engagement member of the tool, is made significantly more difficult.

Preferably, an outer periphery of the second holding element is formed as a polygon in a cross-section perpendicular to the longitudinal direction, and an internal periphery of the complementary second holding element is formed as a complementary surface. The outer periphery of the second holding element can be an external polygon, preferably an external square, pentagon or hexagon or a holding element with a larger number of sides, which is constant in the longitudinal direction, apart from the position of the first holding element, whereas conversely the complementary surface area can be an internal polygon, preferably an internal triangle, square or pentagon or an internal surface with a larger number of sides, with the same internal dimensions as the external dimensions of the outer periphery of the second holding element, so that the second holding element can be introduced into the complementary second holding element and forms a force-fitting connection in the longitudinal direction; for example, an external hexagon is introduced under the action of a force into an internal hexagon and there it initially forms a force-fitting connection. A force is exerted on the internal hexagonal surface by rotary movement of the tool. Therefore the connection of the internal polygon and the external polygon in the direction of rotation is predominantly form-fitting. The procedure can also be transferred to all other embodiments of the second holding element and second complementary holding element.

The engagement member can preferably be introduced into the fastening means only if the first holding element and the complementary first holding element interact. Advantageously any circumvention of the interaction between the first holding element and the complementary first holding element should be prevented. The first holding element and the complementary first holding element preferably interact over the entire extent of the first holding section, wherein the extent of the first holding section is determined by the extent of the complementary first holding element in longitudinal direction outside the second holding section, whilst the extent of the second holding section is determined by the extent of the complementary second holding element in the longitudinal direction.

Particularly preferably the first holding element has a mandrel, and the complementary first holding element has a channel which runs along an inner wall of the first retaining section and along which the mandrel can be guided during the insertion of the engagement member into the fastening means. As the mandrel is moved it is forced onto the path formed by the channel.

Advantageously an internal diameter, preferably each internal diameter, of the first holding position in regions without the complementary first holding element is smaller than an extent of the second holding element with the addition of a diameter of the first holding element. In particular an internal diameter of the first holding section in regions in which no channel is provided is less than an external diameter of the external polygon with the addition of the extent of the at least one mandrel. Advantageously the mandrel cannot be introduced into the first holding section past the channel.

The polygon preferably has a play in the first holding section which, in particular at the start of the introduction, allows a tilting movement of the polygon in the first holding section. However, the play is only so great that also by tilting of the engagement member during the introduction the mandrel cannot find a detour around a channel entry and cannot slide out of the tilted position of the engagement member, circumventing the channel entry, into the channel.

The path is preferably somewhat complex, preferably the curve of the channel is S-shaped, so that the engagement member must carry out the S-shaped movement. Naturally, other path shapes are also conceivable, for instance undulating paths, zigzag paths, or the like. The path is preferably designed so that the engagement member has to carry out a rotary movement and translatory movement, preferably a to-and-fro movement, so that it is difficult to accidentally carry out a rearward movement.

Advantageously, in the second holding section the channel runs in the longitudinal direction. This enables the second holding element to be inserted into the complementary second holding element without the first holding element in the form of a mandrel counteracting the connection of the two partners in the second holding section. The mandrel is advantageously arranged at the end of an engagement member, preferably the mandrel is arranged at the end of an outer periphery of the second holding element, i.e. for example arranged at the end of an external hexagon, pentagon, square, etc.

In the second aspect, the object is achieved by a method with the features of claim 9.

The method can be carried out by one of the above-mentioned arrangements, conversely each of the above-mentioned arrangements is suitable for one of the following methods. The statements relating to the arrangement also apply to the method as disclosed.

The method serves for fastening a fastening means adapted to be received in a body having a longitudinal direction by means of a tool. The tool has a first holding element and a second holding element and the screw has a first holding section with a complementary first holding element and a second holding section with a complementary second holding element.

According to the method the tool is guided in a combination of translational and rotational movements through the first holding section, and in the first holding section the first holding element and the complementary first holding element interact, so a that falling off of the fastening means from the tool is made difficult, the first holding section leaves only a slight play for the longitudinal axis of the tool to deviate from the longitudinal axis of the fastening means while maintaining the connection between the first and the complementary first holding element, and the tool is introduced into the second holding section, and there the second holding element and the complementary second holding element interact, the tool is rotated, and a rotary movement of the tool is transferred to the fastening means and the fastening means is adapted to be fastened in the body.

Preferably a screw is selected as the fastening means, and the fastening means is adapted to be firmly screwed into the body.

According to the invention the method for a temporarily releasable connection of the tool to the fastening means runs substantially through two method steps. On the one hand the engagement member of the tool runs through a first holding section and preferably thereafter a second holding section, wherein a first holding element and a complementary first holding element interact in the first holding section and preferably in addition a second holding element and a complementary second holding element interact in a second holding section, wherein the first holding element and the complementary first holding element enforce a combination of translational and rotational relative movements, and preferably in a rotary movement the second holding element and the complementary second holding element form a force-fitting connection which in a particularly stable manner transmits the force the rotary movement of the tool to the fastening means. The engagement member of the tool is advantageously guided in an S-shaped movement through the first holding section. However, other patterns of movement which are not purely translatory and extend in the longitudinal direction are also conceivable, for example also undulating movements, zigzag movements or similar movements. Advantageously the tool is guided through the first holding section in an S-shaped movement, which also includes a short translatory return movement during passage. In a particular way this makes it difficult for the screw to slide off from the tool in the first holding section.

Figure 2:
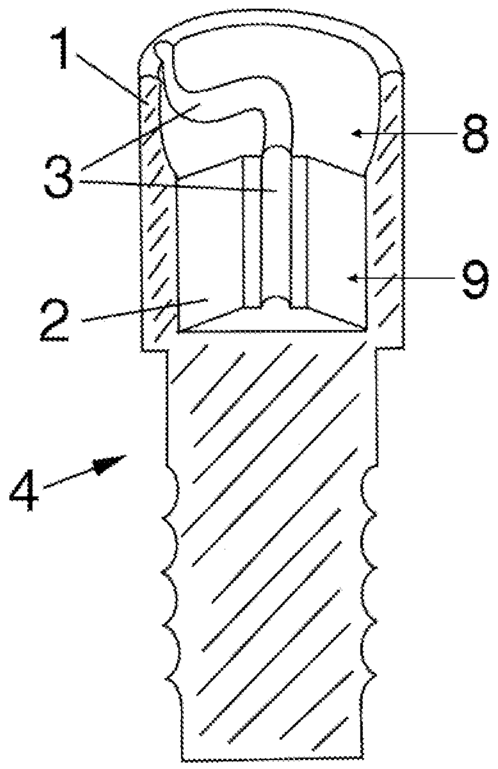
Figure 3A:
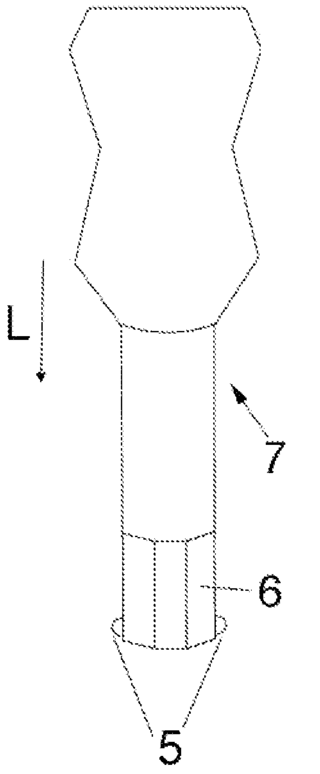
Figure 3B:
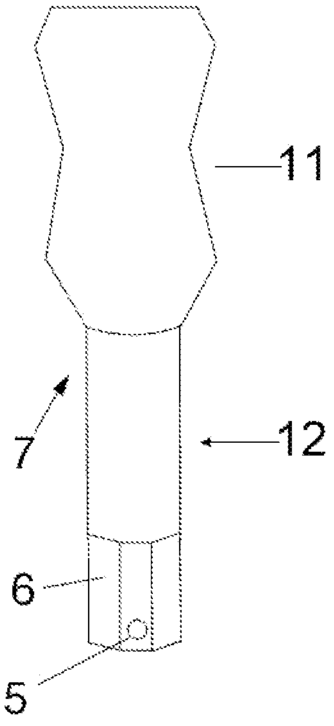
Figure 4:
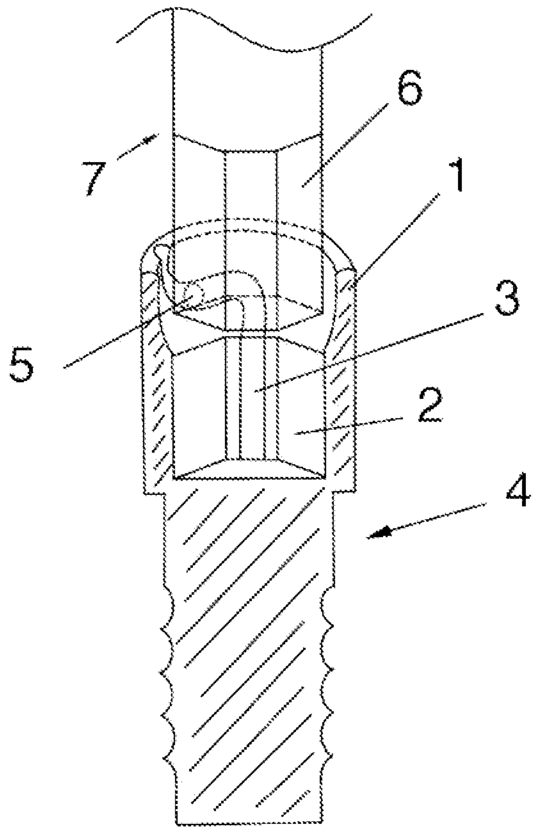

The invention is described with reference to an embodiment with five drawings. In the drawings:

FIG. 1 shows an oblique view of a prosthetic screw head with an internal hexagon and a channel formed in an inner wall, FIG. 2 shows a sectional view along the line II-II in FIG. 1, FIG. 3*a* shows a screwdriver with an external hexagon and two mandrels, FIG. 3*b* shows a view of the screwdriver rotated by 90° relative to FIG. 3*a*, FIG. 4 shows a side view, partially as a sectional view of an engagement member of the screwdriver introduced into the screw.

FIG. 1 shows a screw head 1 of a screw 4 according to the invention with an inner wall and an outer wall which transitions into a thread in the section remote from the head.

Two opposing, preferably concave channels 3 are formed in the inner wall of the screw head 1. The channels 3 have an S-shaped curvature in an upper first holding section 8 at the head end. The two channels can be identically mapped to one another rotatably by 180° about a centre axis of the screw head 1. The S-shaped channel 3 is designed in such a way that at the start of the first holding section 8 it runs substantially in a longitudinal direction L of the screw 4 and then forms a curve running towards the left, wherein the channel 3 is then turned back some way in the direction of the upper end of the screw head 1, in order then to run through again in a curve towards the right again strictly in the longitudinal direction L until the end of a second holding section 9. The opposing channel is not illustrated in FIG. 1 apart from a channel inlet.

A diameter of the first holding section 8 is greater than a diameter of the second holding section 9. Advantageously, each diameter of the first holding section 8 is greater than a diameter of the second holding section 9. The second holding section 9 is designed as an internal hexagon 2, the first holding section 8 is designed as an internal cylinder with two channels 3 running in the cylinder wall.

FIG. 2 shows the screw 4 in a sectional view. The screw head 1 has the first holding section 8 in the upper region and has the second holding section 9 in the lower region. One of the two opposing channels 3 is illustrated in FIG. 2. The region adapted to be screwed into the body is designed as an external thread.

FIG. 3*a* and FIG. 3*b* show the tool in the form of a screwdriver 7 with a screwdriver head 11 and an engagement member 12. The representation of FIG. 3*a* is rotated by 90° relative to the representation in FIG. 3*b*. The engagement member 12 has a first holding element in the form of two preferably hemispherical mandrels 5 as well as a second holding element in the form of an external hexagon 6. The mandrels 5 naturally can also be shaped differently. Cylindrical or tetrahedral shapes or other shapes can also be used for the mandrel 5. The second holding element does not necessarily have to be designed as an external hexagon, it can also be designed as an external square or pentagon or can also have another shape. However, the shape should not be rotationally symmetrical, but in the embodiment with two mandrels 5 it should preferably be rotationally symmetrical about 180°.

The screw 4 illustrated in FIGS. 1 and 2 is preferably a prosthetic screw. The screwdriver 7 according to the invention, which is illustrated here as an external hexagon 6 having two mandrels 5, can engage in the screw head 1 and can be inserted therein in two spatial positions. The two positions are rotationally symmetrical about 180°.

In both engaged positions the two mandrels 5 engage simultaneously in the two concave channels 3 which are formed in the screw head inner wall. The two channels 3 are situated opposite one another and are rotated by 180° with respect to one another and have the S-shaped curve illustrated in FIG. 1.

In FIG. 4 it is shown how the engagement member 12 of the screwdriver 7 is introduced into the screw head 1. In this case first the engagement member 12 of the screwdriver 7 with the two mandrels 5 is positioned above the associated channels 3 and is introduced into the first holding section 8 in a combination of translational and rotational movements. In this case the screwdriver 7 is guided in the path predetermined by the S-shaped configuration of the channel 3. First of all the screwdriver 7 is moved towards the screw and then in a rotation in a clockwise direction is again rotated some way out of the screw head 1, in order then to be introduced into the second holding section 9 in a translatory movement in a longitudinal direction L. The start and the end of the channel 3 optimally span the greatest possible angle in relation to the circular cross-section of the screw head 1. In the exemplary embodiment described here, for better representation in the drawings this angle is chosen to be somewhat smaller than it really is. The greater this angle is, i.e. the longer the path of the channel 3 extends over the screw head, the smaller is the risk of an accidental or unintentional reversal of this introduction movement and thus of the separation of the connection between the engagement member 12 and the screw head 1. After the engagement of the mandrel 5 in the channel 3, during the rotation in a clockwise direction relative to the prosthetic screw 4 and around the common longitudinal axis, the hexagonal screwdriver 7 follows the curvature of the channel 3, and a form-fitting connection is produced. For completion of the movement in the first holding section 8, the hexagonal screwdriver 7 and the prosthetic screw 4 approach a position in which the external hexagon 6 is inserted perpendicularly, i.e. in the longitudinal direction L, into the internal hexagon 2 of the screw head 1, producing a force-fitting connection in the longitudinal direction and a form-fitting connection in the direction of rotation. The channels 3 of the first holding part 8 are continued in the walls of the second holding sections 9, so that the mandrels 5 of the force-fitting hexagonal connection do not stand in the way. If the external hexagon 6 of the screwdriver should come loose from the internal hexagon 2 the screw 4 due to sudden shear or pull-off forces which could act on the screw 4, for example by sudden tongue movements of the patient, the screw 4 is prevented from suddenly falling from the screwdriver 7 by the interengagement of the mandrel 5 and the channel 3. The screw 4 remains loosely fastened to the screwdriver 7, and as a result time remains for the dentist or the user to in order to reintroduce the screwdriver completely into the screw and to restore the connection in the second holding section 9. Thus, furthermore, the user must carefully monitor the procedures with regard to any action of such forces in order to react quickly if necessary. Overall, due to the succession of a first holding section 8 and a second holding section 9 the reliability of the screwing in of screws into an external thread is significantly increased, since the probability of the screw 4 falling by chance from the screwdriver 7 is significantly reduced. Even if the connection of the external and internal hexagons 6, 2 is lost, the screw 4 is initially still arranged on the screwdriver 7 by means of the interaction of the channel 3 and the mandrel 5 and for example in the event of dental treatment it does not immediately fall into the patient's oral cavity or throat.

LIST OF REFERENCES

1 screw head
2 internal hexagon
3 channel
4 screw
5 mandrel
6 external hexagon
7 screwdriver
8 first holding section
9 second holding section
11 screwdriver head
12 blade
L longitudinal direction

The invention claimed is:

1. A fastening system comprising:
- a tool (7), wherein the tool (7) further comprises:
  - an engagement member (12);
  - a first holding element (5); and
  - a second holding element (6),
- a fastening means (4) having a longitudinal direction (L), and wherein the fastening means (4) further comprises:
  - a first holding section (8) with a complementary first holding element (3); and
  - a second holding section (9) with a complementary second holding element (2); and wherein the second holding section (9) is arranged in the longitudinal direction (L) before the first holding section (8);
- wherein the tool (7) screws the fastening means (4) which is adapted to be received in a body in the longitudinal direction (L), and the engagement member (12) is inserted into the fastening means (4);
- wherein the first holding element (5) and the complementary first holding element (3) interact, while allowing movements of the engagement member (12) relative to the fastening means (4);
- wherein the first holding element (5) and the complementary first holding element (3) block a translatory movement of the engagement member (12) in the longitudinal direction (L), when no rotary movement is provided at the same time, thereby preventing the fastening means (4) from detaching from the tool (7) without additional rotary movement;

wherein the second holding element (6) and the complementary second holding element (2) allow for a rotary movement of the engagement member (12) to be transferred to the fastening means (4) and the fastening means (4) is adapted to be screwed into the body;

wherein the engagement member (12) is introduced into the fastening means (4) only when the first holding element (5) and the complementary first holding element (3) connect.

2. The fastening system according to claim 1, wherein an outer periphery of the second holding element (6) forms as a polygon in a cross-section perpendicular to the longitudinal direction (L), and an internal periphery of the complementary second holding element (2) forms a complementary shape.

3. The fastening system according to claim 1, wherein the first holding element comprises a mandrel (5) and the first complementary holding element further comprises a channel (3) running along an inner wall of the first holding section, wherein the mandrel (5) is guided during the insertion operation.

4. The fastening system according to claim 3, wherein a curve of the channel (3) is S-shaped.

5. The fastening system according to claim 3, wherein the channel (3) in the second holding section (9) runs in the longitudinal direction (L).

6. The fastening system according to claim 3, wherein a mandrel (5) is arranged at one end of the engagement member (12).

7. The fastening system according to claim 1, wherein the fastening means is formed as a screw (4).

8. A method for fastening a fastening means (4) in a longitudinal direction (L) with a tool (7), wherein the tool (7) further comprises:

an engagement member (12);

a first holding element (5); and a second holding element (6), a fastening means (4) having a longitudinal direction (L), and wherein the fastening means (4) further comprises:

a first holding section (8) with a complementary first holding element (3); and a second holding section (9) with a complementary second holding element (2); and wherein the second holding section (9) is arranged in the longitudinal direction (L) before the first holding section (8);

and the fastening means (4) is adapted to be received in a body comprising the steps of:

introducing an engagement member (12) into a first holding section (8) with a combination of translational and rotational movements;

interacting a first holding element (5) and a complementary first holding element (3) in the first holding section (8);

introducing the engagement member (12) into a second holding section (9);

interacting a second holding element (6) and a complementary second holding element (2) into the second holding section (9);

rotating the tool (7);

transferring a rotary movement of the tool (7) to the fastening means (4); and screwing the fastening means (4) adapted to be received in a body; wherein the tool (7) has the engagement member (12) with the first holding element (5) and the second holding element (6); and wherein the fastening means (4) has the first holding section (8) with the complementary first holding element (3) and the second holding section (9) with the complementary second holding element (2).

9. The method according to claim 8, wherein when the second holding element (6) loosens from the complementary second holding element (2), the first holding element (5) interacts with the complementary first holding element (3) in the first holding section (8) and by blocking a translatory movement of the engagement member in the longitudinal direction when no rotary movement is provided at the same time prevents the fastening means (4) from falling from the tool (7) without additional rotary movement.

10. The method according to claim 8, wherein the tool (7) is guided in an S-shaped movement through the first holding section (8).

11. The method according to claim 8, wherein the tool (7) is introduced into the first holding section (8) in an S-shaped movement comprising a combination of translational and rotational movements.

12. The method according to claim 8, wherein the engagement member (12) is introduced into the first holding section (8) and then into the second holding section (9).

13. The method according to claim 8, wherein a screw (4) is selected as the fastening means and the screw (4) is adapted to be received in a body.

* * * * *